United States Patent [19]

Remigio et al.

[11] Patent Number: 4,803,379

[45] Date of Patent: Feb. 7, 1989

[54] CIRCUIT ARRANGEMENT FOR POWER SUPPLY FOR ELECTRICAL AND ELECTRONIC CONTROL OR REGULATING DEVICES

[75] Inventors: Ros Remigio, St. Georgen; Storz Achim, Triberg, both of Fed. Rep. of Germany

[73] Assignee: Dieter Grässlin Feinwerktechnik, Fed. Rep. of Germany

[21] Appl. No.: 45,849

[22] PCT Filed: Aug. 28, 1986

[86] PCT No.: PCT/DE86/00343

§ 371 Date: May 6, 1987

§ 102(e) Date: May 6, 1987

[87] PCT Pub. No.: WO87/01880

PCT Pub. Date: Mar. 26, 1987

[30] Foreign Application Priority Data

Sep. 13, 1985 [DE] Fed. Rep. of Germany ....... 3532758

[51] Int. Cl.$^4$ .......................... H03K 3/00; H01L 9/12
[52] U.S. Cl. ......................................... 307/112; 307/3; 307/311; 307/108; 307/109; 307/37; 307/106; 363/48; 400/120; 328/67; 361/190
[58] Field of Search ................... 307/15, 24, 3, 28, 29, 307/32, 34, 36, 35, 37, 38, 39, 40, 41, 108, 109, 268, 264, 265, 595, 596, 597, 598, 606, 150, 152, 141.8, 311, 106; 323/268, 271; 363/126, 15, 16, 48; 361/166, 183, 189, 190, 191, 206, 160, 154, 155, 151, 168, 170, 171, 192, 193, 194; 328/76, 67; 400/120

[56] References Cited

U.S. PATENT DOCUMENTS

| | | | |
|---|---|---|---|
| 3,135,876 | 6/1964 | Embree et al. | 328/67 X |
| 3,139,586 | 6/1964 | Dolan | 328/67 |
| 3,144,567 | 8/1964 | Moehlmann | 307/109 X |
| 3,268,776 | 8/1966 | Reed | 361/190 X |
| 3,268,822 | 8/1966 | Hickey | 328/67 |
| 3,274,397 | 9/1966 | Heckman et al. | 307/66 X |
| 3,335,319 | 8/1967 | Warner | 307/37 X |
| 3,417,259 | 12/1968 | Nozawa et al. | 307/41 X |
| 3,435,256 | 3/1969 | Young | 328/67 X |
| 3,458,711 | 7/1969 | Calkin et al. | 307/36 |
| 3,496,385 | 2/1970 | Hopkins | 307/597 X |
| 3,513,328 | 5/1970 | Auger | 307/108 |
| 3,567,972 | 3/1971 | Faust | 307/311 |
| 3,581,104 | 5/1971 | Thew | 307/15 |
| 3,590,153 | 6/1971 | Minowa | 307/311 X |
| 3,874,255 | 4/1975 | Minami | 361/166 X |
| 4,011,463 | 3/1977 | Fasching | 307/109 X |
| 4,042,837 | 8/1977 | Nyswander | 307/265 |
| 4,059,844 | 11/1977 | Stewart | 361/191 X |
| 4,070,589 | 1/1978 | Martinkovic | 328/67 X |
| 4,126,793 | 11/1978 | de Vries | 307/3 X |
| 4,227,230 | 10/1980 | Bray | 361/191 X |
| 4,306,183 | 12/1981 | Wright | 307/57 X |
| 4,369,490 | 1/1983 | Blum | 363/48 |
| 4,484,257 | 11/1984 | Sugimoto | 323/271 X |
| 4,492,879 | 1/1985 | Tsuchiya et al. | 307/268 X |
| 4,543,587 | 9/1985 | Kurata et al. | 400/120 X |
| 4,651,021 | 3/1987 | Hawkey | 328/67 X |
| 4,672,522 | 6/1987 | Lesea | 363/48 |

*Primary Examiner*—William M. Shoop, Jr.
*Assistant Examiner*—Paul Ip
*Attorney, Agent, or Firm*—Hill, Van Santen, Steadman & Simpson

[57] ABSTRACT

A circuit arrangement having a purely capacitive power supply, at least one power consumer, and a control element for causing power to be supplied to the power consumer. The power supply, the power consumer and the control element form a series circuit. The power consumer has a relay activated by a switching transistor, the switching transistor is connected to the control element. The purely capacitive power supply has a series capacitor for defining the current flow in the series circuit. The circuit arrangement may have a plurality of power consumers connected in series with each other and in series with the power supply and the control element.

1 Claim, 1 Drawing Sheet

U.S. Patent  Feb. 7, 1989  4,803,379
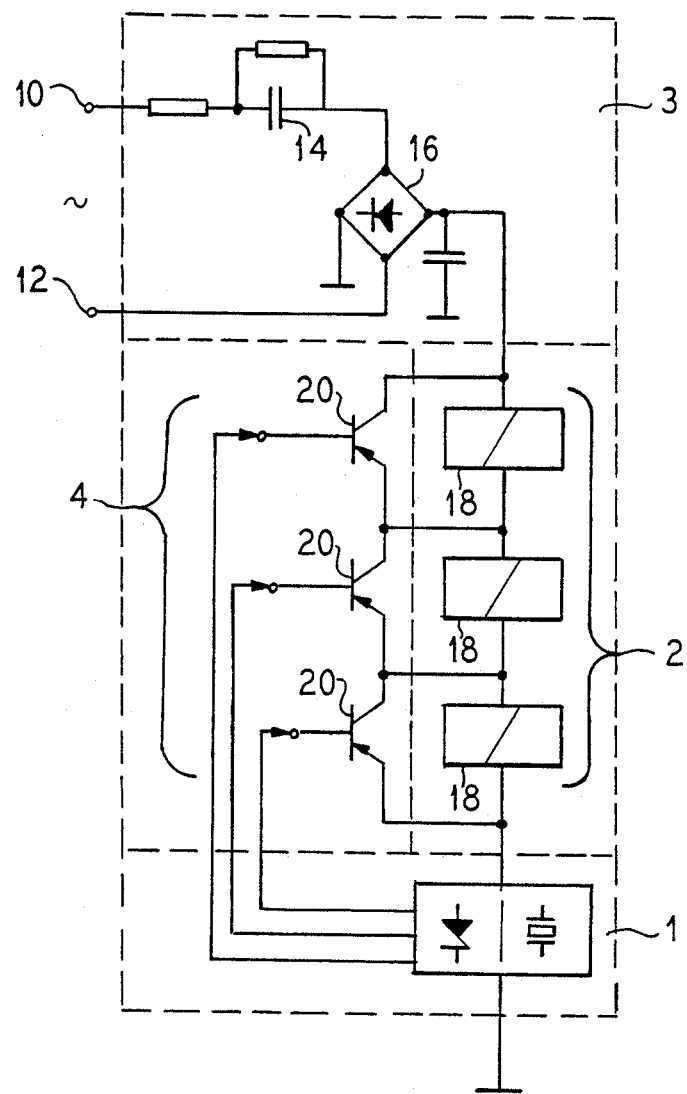

CIRCUIT ARRANGEMENT FOR POWER SUPPLY FOR ELECTRICAL AND ELECTRONIC CONTROL OR REGULATING DEVICES

BACKGROUND OF THE INVENTION

The invention is directed to a circuit arrangement for a power supply of a control or regulating element and of active power consumers comprising a power pack with voltage rectification, particularly a capacitative power pack, and/or comprising an accumulator, for electrical and electronic control or regulating devices.

Such devices such as time switch clocks, room thermostat timers, program switching devices, time relays, machine controls and regulators, freely programmed, remote controlled executive sequencers —to name only a few—are usually provided with a control or regulating element, particularly a voltage-stabilized control or regulating element, and with relatively power-intensive power consumers such as switch relays, motors, controlled heating resistors or lamps that are actuated by the control or regulating element. Not only do such power consumers require an appropriately dimensioned power supply, but the power supply should also produce only relatively little stray hear, should require little space and should be economically manufacturable. The use of a capacitive, so-called capacitor power pack should be assured.

In the known circuit arrangements for the power supply of such devices, the control or regulating elements and the power consumers are connected electrically parallel to one another and to the power supply. In particular, the power packs therein must be appropriately dimensioned in terms of their power. The development of stray heat and the space required are correspondingly high and the costs of acquisition are considerable. The use of a capacitive power pack is often impractical in such circuit arrangements for dimensioning-related and economical reasons. Also disadvantageous is that a universally employable power supply is provided for reasons of economy and efficiency in devices of the species initially cited wherein only one or more power consumers can be provided, this universally employable power supply having to be designed therein for the apparatus having the highest energy consumption, thus having to be designed with a relatively large space requirement, a relatively great stray power and high acquisition costs.

SUMMARY OF THE INVENTION

The object of the invention is to avoid these disadvantages of the known arrangements and to create a circuit arrangement for the power supply of devices of the species initially cited which cannot only be universally employed in a plurality of apparatus having a different number of power consumers but which also exhibits a relatively low development of stray heat, a low space requirement and also economically enables the use of what is referred to as a capacitor power pack.

This objective is achieved with a circuit arrangement which has a purely capacitive power supply, at least one power consumer, and a control element for causing power to be supplied to the power consumer. The power supply, the power consumer and the control element form a series circuit. The power consumer may have a relay activated by a means for switching, such as a transistor. The means for switching is connected to the control element. The purely capacitive power supply has a series capacitor for defining the current flow in the series circuit. The circuit arrangement may have a plurality of power consumers connected in series with each other and the power supply and the control element.

What is advantageous in this circuit arrangement is not only the simple, electrically optimum and economical structure of the power supply, particularly with a capacitor power pack with voltage rectification, but also the relatively small space requirement and the extremely low development of stray heat that can be achieved therein, not only in the power pack but also in the power consumers. Further advantageous therein is that, in particular, the windings of inductive power consumers can serve as a dropping resistor during operation not only for a provided stabilization of the supply voltage of a control or regulating element but can also act as a limit of the charging current in a provided accumulator operation.

The excitation current of a power consumer is equal therein to the supply current for a control or regulating element, particularly a control or regulating element following one or more power consumers. Since a pre-stabilization for power consumers is likewise not necessary therein, the development of stray heat in the arrangement is also considerably reduced in comparison to the known parallel circuit arrangements.

A further advantage of this circuit arrangement is the optimum exploitation of the supply current for the power consumers, so that a relatively minimal power consumption is achieved therein given employment of a power pack. In particular, a relatively broad range of supply voltage is achieved given employment of an exclusive capacitor power pack.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several of which like reference numerals identify like elements, and in which:

The single FIG. is a circuit diagram of a purely capacitive power supply in series with power consumers and a control element.

DESCRIPTION OF THE PREFERRED EMBODIMENT

The FIGURE essentially shows a circuit arrangement comprising a power supply 3 having a capacitative, so-called capacitor power pack with voltage rectification. 1 references a control or regulating element of an electrical or electronic control or regulating device which is illustrated by a quartz symbol whose voltage supply is stabilized. One or more power consumers 2 are connected in series with the power supply 3 and with the control or regulating element 1, these power consumers 2 being controlled by switch elements 4 that are in turn charged by the control or regulating element 1 in conformity with a switching program. Semiconductor switches, particularly transistors are provided as switch elements 4.

More specifically, the present invention as embodied in the circuit shown in the FIG. has a purely capacitive power supply 3. This power supply 3 receives alternating power on terminals 10 and 12. A capacitor 14 is a capacitive drop resistor and is connected between the terminal 10 and rectifier 16. The capacitor 14 defines the current that flows in the series circuit having the capacitor 14, the power consumers 2 having relays 18, and the control element 1. The transistor 20 switches the relays 18 on and off.

The control element 1 represents electrical devices such as switch clocks, timers, thermostats, etc. The power consumers 2, connected to the power supply 1 by their corresponding relays 18, are motors, controlled heating resistors, lamps, etc. When the relays 18 are switched on and off via the transistors 24 which have their gates connected to the control element 1, the voltage following the rectifier 16 changes. However, the voltage changes only slightly at the capacitor 14 in the power supply 3 since its AC resistance is relatively constant. Therefore, the current through the series circuit remains substantially constant.

It lies within the framework of the invention that other power packs, for example a switched power pack or an inductively separated power pack comprising a transformer and a following, capacitative alternating current resistor can be utilized with full advantage instead of the power supply that has been shown and described.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A circuit arrangement comprising: a purely capacitive power supply having a series capacitor for providing current flow;
    a plurality of power consumers connected in series with said power supply;
    a plurality of semiconductor switches, each of said power consumers of said plurality of power consumers having one of said semiconductor switches of said plurality of semiconductor switches connected in parallel therewith;
    a control element for causing power to be selectively supplied via a respective semiconductor switch to at least one of said plurality of power consumers and connected in series with said plurality of power consumers and said power supply, said current flow determined by said series capacitive in said power supply and by said selected power consumers.

* * * * *